United States Patent

Whitehouse

[15] 3,701,147

[45] Oct. 24, 1972

[54] SURFACE WAVE DEVICES FOR SIGNAL PROCESSING

[72] Inventor: Harper John Whitehouse, San Diego, Calif.

[73] Assignee: The United States of America as represented by the Secretary of the Navy

[22] Filed: Feb. 3, 1971

[21] Appl. No.: 112,165

Related U.S. Application Data

[63] Continuation-in-part of Ser. No. 793,148, Jan. 22, 1969, abandoned.

[52] U.S. Cl. ..........340/347 DA, 333/30, 340/173 A, 340/173 RC

[51] Int. Cl. ..........H03k 13/02

[58] Field of Search..........340/347, 173 A, 173 RC; 333/29, 30; 179/15.55

[56] References Cited

UNITED STATES PATENTS

| | | | |
|---|---|---|---|
| 3,600,710 | 8/1971 | Adler | 333/30 |
| 3,555,522 | 1/1971 | Martin | 340/173 RC |
| 3,479,572 | 11/1969 | Pokorny | 333/30 |
| 3,611,203 | 10/1971 | Cooper | 333/30 |
| 3,488,635 | 1/1970 | Sifferlen | 340/173 RC |
| 2,978,680 | 4/1961 | Schulte | 340/173 RC |
| 3,064,241 | 11/1962 | Schneider | 340/173 RC |
| 3,368,203 | 2/1968 | Loizides | 340/173 RC |
| 3,432,816 | 3/1969 | Huchinson | 340/173 RC |

*Primary Examiner*—Thomas A. Robinson
*Assistant Examiner*—Jeremiah Glassman
*Attorney*—Richard S. Sciascia, Ervin F. Johnston and John Stan

[57] ABSTRACT

A distributed-transducer surface wave device for signal processing of the type which comprises a crystal substrate upon which is disposed at least one transducer set, including an input transducer adapted for connection to an input electrical signal and an output transducer, each transducer including at least a pair of interdigitated electrodes, the application of an electrical signal to the input transducer causing surface wave propagation on the surface of the crystal substrate, the electrodes of the transducers being aligned in a direction perpendicular to the direction of wave propagation, wherein the interdigitations of the electrodes are generally coded, for example, according to a Barker code. The surface wave device further comprises a logic decision circuit having three input connections: (1) a first input connected to the output transducer; (2) a second adapted for connection to a clock sync source; and (3) a third adapted for connection to a source of binary signals; the output of the logic decision circuit being connected to the input transducer. A function of the logic devision circuit is to enable an incoming pulse from the binary signal source, if present, to be transmitted to the input transducer, otherwise to enable pulses from the output transducer to be circulated through the transducer set, all pulses being clocked by signals from the clock sync source. One of the main functions of the acoustic wave devices of this invention is to serve as a delay line for the propagating surface wave.

12 Claims, 7 Drawing Figures

INVENTOR.
HARPER JOHN WHITEHOUSE
BY ERVIN F. JOHNSTON
ATTORNEY.
JOHN STAN, AGENT.

SURFACE WAVE DEVICES FOR SIGNAL PROCESSING

CROSS-REFERENCE TO A RELATED APPLICATION

This application is a continuation-in-part of the application having the Ser. No. 793,148, now abandoned, entitled "Acoustic Wave Device," and filed on January 22, 1969 by the same inventor.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a distributed-transducer surface wave device for signal processing of the type which comprises a crystal substrate, upon which are generally disposed a plurality of transducer sets, including an input transducer adapted for connection to an input electrical signal and an output transducer. Each transducer includes at least a pair of interdigitated electrodes, the application of an electrical signal to the input transducer causing surface wave propagation on the surface of the crystal substrate, the electrodes of the transducers being aligned in a direction perpendicular to the direction of wave propagation.

The transducer sets may be arranged in a manner to form multi-bit delay lines called DELTIC's, and a clock serving as a source of time signals for shifting the flow of bits in the DELTIC may be included. A correlator may also be included on the same substrate, and may have as an input the output of the DELTIC after modulation by frequency translation for further signal processing.

The prior art delay lines for signal processing, most of which were volume way delay lines, had one or more of the following disadvantages: (1) they were difficult to support or mount to other structures; (2) the transducer structures for the prior art volume wave delay lines were difficult to fabricate; (3) they were not amenable to integrated circuit techniques; (4) generally, elaborate temperature control or temperature compensation was required; and (5) almost all of the prior art volume wave delay lines were limited to one channel of storage per body, i.e., the prior art technique did not provide for interchannel separation.

SUMMARY OF THE INVENTION

The general purpose of this invention is to provide a distributed-transducer surface wave device used as a delay line for signal processing, which embraces most of the advantages of similarly employed prior art delay lines and possesses none of the aforedescribed disadvantages. To achieve this purpose, the present invention contemplates a unique acoustic wave device comprising at least one set, usually comprising a pair, of transducers, an input transducer, sometimes termed a launch or transmitter transducer, and an output transducer, sometimes termed a receive or detector transducer, each transducer comprising two sets of interdigitated electrodes mounted upon a crystal used as a substrate, with the interdigitations generally being coded for improved results. Adjacent interdigitations represent a O or a 1, depending upon the order of their arrangement in the direction of surface wave propagation.

The mode of operation of the device is basically twofold: to provide a surface wave delay line where the input and output transducers are separated to the limit of the width of the substrate and so coded as to provide high bandwidth. Or, alternatively, to operate as a signal processing filter if the transducers are in juxtaposition and are tapped contiguously along the entire length of the propagation path.

The amplitude of the wave propagating along the surface of the substrate is not modulated. However, positional modulation of the wave may be achieved by changing the dimensions of the interdigitated electrodes spacially on the surface of the substrate.

When coded, the input and output transducers are preferably encoded similarly, in accordance with optimum detection characteristics according to statistical detection theory. The interdigitated electrodes of the input and output transducers are mounted on the surface of the substrate with their individual electrode strips arranged parallel to each other. The distance separating the leading edges, or any other two corresponding electrodes, of the input and output transducers forming a transducer pair provides the delay for the acoustic signal. This acoustic signal propagates as a surface wave along the crystal, as distinct from the volume waves of prior art crystal delay lines.

The distributed acoustic wave device of this invention has many advantages over similar devices used in the prior art.

The acoustic wave device is convenient to mount and attach to some other structure for support. The crystals, being thin, may be conveniently packaged. The device may be simply bonded to another surface using the face of the crystal opposite the one upon which the electrodes are mounted or disposed. The interdigitated, photo-etched electrodes are fabricated with ease in dimension control, this of course being the usual advantage of use of a photo-etching process.

The basic construction of the acoustic wave device lends itself to integrated circuit construction techniques. For example, electric return paths may be made of aluminum, copper, or some other conductor deposited on the active surface of the crystal substrate. Any type of electric conductive path arrangement may be either photo-etched, starting with copper-clad material, or deposited on the active surface, or even on the opposite, inactive surface. Chip-type semiconductor amplifiers may be directly bonded to one surface of the crystal used as a substrate. Other basic data processing components, such as clocks, time compressors, and correlators may be fabricated on one of the surfaces of the same crystal used as a substrate.

Temperature stability of the acoustic wave device is achieved by proper crystal choice and proper cut or orientation, while differential temperature stability is achieved between two delay lines (or one or more lines and a clock channel) by the common crystal substrate on which the surface waves travel. When a delay line is placed on a crystal surface which serves as a common substrate for other delay line channels or other components affected by the surface waves, temperature control or temperature stabilization of the environment is often not needed for the total integrated circuit.

Interchannel separation is an important feature provided by this invention. Interchannel interference on a surface wave piezoelectric crystal device may be controlled by a directivity pattern or by a code choice, e.g., uncorrelated codes for different channels. Thus the directivity of the transducer, and the discrimination afforded by the electrodes coated on the surface allow more than one delay line, or other surface wave device, to be mounted to the same active crystal surface.

Since surface waves can follow gentle curves, the crystal structure may be configured to fit surfaces other than planar mounting surfaces.

The acoustic wave devices of this invention are up to 100 times smaller than torsional delay line implementations used for the same purpose. Also, it is up to 100 times faster (data processing speed) since a single crystal rather than polycrystaline delay medium is used.

STATEMENT OF THE OBJECTS OF THE INVENTION

Accordingly, an object of the present invention is the provision of an acoustic wave device for signal processing which is not limited to only one channel per crystal body, i.e., the surface wave device provides interchannel separation.

Another object is to provide an acoustic wave device for signal processing not requiring elaborate temperature control or temperature compensation.

A further object of the invention is the provision of an acoustic wave device for signal processing which is amenable to integrated construction, such as by the use of a single crystal as a common substrate.

Still another object is to provide an acoustic wave device for signal processing which is easy to support or mount to another structure, and also which is easy to fabricate, and may have other components mounted on it.

Other objects and many of the attendant advantages of this invention will be readily appreciated as the same becomes better understood by reference to the following detailed description, when considered in connection with the accompanying drawings, in which like reference numerals designate like parts throughout the figure thereof and wherein:

A key feature of the invention is that two or more delay lines or other types of processors may be mounted upon a common substrate, and the mode of operation of any one of the delay lines or processors may be independent of the mode of operation of any other delay line or processor. If the acoustic wave device contains only two processors, for example two delay lines, the signal traversing the surface of one of them may be considered to traverse an upper channel of the acoustic wave device, while a second signal may be said to traverse a lower channel.

DESCRIPTION OF THE PREFERRED EMBODIMENTS

Figure 1:
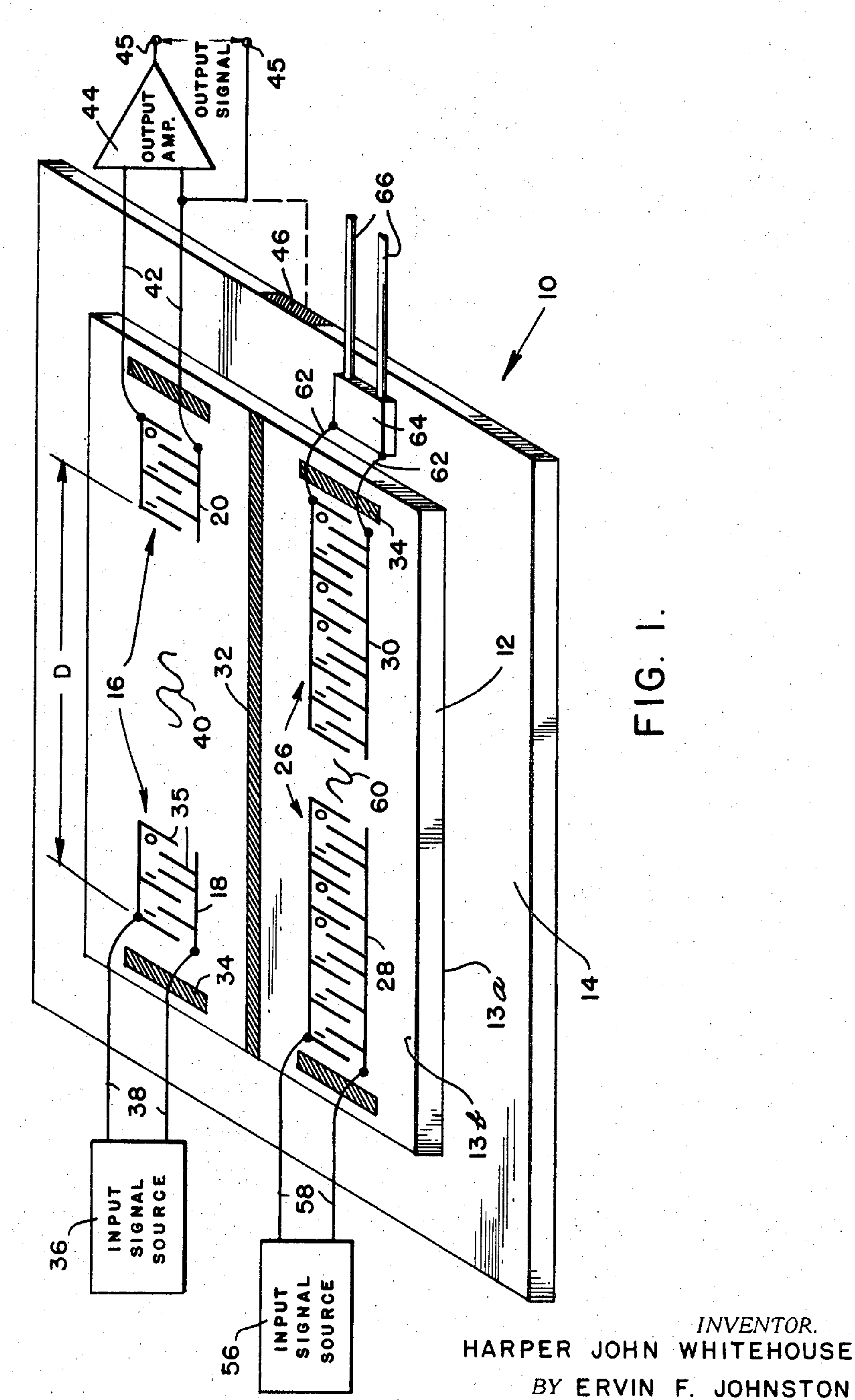
FIG. 1 is a view, partly diagrammatic and partly in block form, of one embodiment of the acoustic wave device of this invention, showing two transducer channels, each including a pair of coded transducers.

Referring now to FIG. 1, acoustic wave device 10 comprises a crystal substrate 12 which is mounted or deposited or otherwise disposed upon a base 14. The crystal substrate 12 comprises a bottom, acoustically inactive, surface **13*a* which may be attached to the base 14, and an acoustically active upper surface 13*b* upon which the active elements of the acoustic wave device 10** are positioned.

Attached to the upper surface **13*b* of the crystal substrate 12 is an upper channel transducer pair 16, consisting of an upper channel input transducer 18 aligned in the direction of wave propagation with an upper channel output transducer 20. Also mounted upon the crystal substrate 12 is a lower channel transducer pair 26, consisting of a lower channel input transducer 28 aligned with a lower channel output transducer 30. It should be pointed out that more than two transducers may be aligned in any one channel. Separating the upper channel transducer pair 16 from the lower channel transducer pair 26 is an isolator and divider strip 32. Also, at each end of the transducer pairs 16 and 26 are absorber stripes 34. Each of the four transducers include an electrode structure including interdigitated electrodes 35**, which comprise the active elements.

A periodic interdigitated structure including interdigitated electrodes 35, as shown in FIG. 1, corresponds to a high Q electrical tank circuit, as the term "tank" is commonly used in electronics.

The mode of operation of the acoustic wave device 10 is as follows: An electrical signal generated by input signal source 36, sometimes termed a launch transducer, is transmitted over leads 38 and impressed upon the interdigitated electrodes 35 of upper channel input transducer 18.

The input electrical signal generated by input signal source 36 may be either rectangular pulses, or pulses of some other shape. The mode of coding of the interdigitations 35 is shown by the )'s and 0's at the top part of the electrode structure 35 of the upper channel transducer 16 and the lower channel transducer 26.

If the transducer pairs 16 and 26 are to be used for coding, the interdigitations of the electrode structure are not uniformly alternate, i.e., a Barker code. However, in the usual case, whether coded or uncoded, the interdigitations of the output transducer 20 or 30 are identical to those of the respective input transducer 18 or 28, as is shown in FIG. 1.

The interdigitations of electrodes 35 in transducer 20 are configured to give maximum processing gain for the Barker coded signal generated by the input transducer 18. The coding results in a processing gain in the sense that there is coherent addition or superposition of the signals from each of the individual strips of the electrodes 35 simultaneously.

The electrical signal is transduced by the upper channel input transducer 18 into an upper channel acoustic surface wave, designated by reference symbol 40 in the figure, which traverses the upper half of the top surface **13*b* of the crystal substrate 12. Isolator divider strip 32 serves to prevent upper channel acoustic surface wave 40 traversing the upper channel of crystal substrate 12 from from having any effect on surface waves traversing any other channels of the surface wave device 10** which are located below it.

The acoustic surface wave 40 traversing the upper half of top surface **13*b* is, in turn, transduced by upper channel output transducer 20 into an electrical signal, which traverses leads 42 connected to upper channel output amplifier 44, thereby producing an output signal at output terminal 45**.

Absorber stripes 34 at each end of the upper channel transducer pair 16 serve to prevent the acoustic surface wave 40 from traversing the upper channel, on top surface **13*b* of crystal substrate 12**, more than once, that is, they prevent reflections of the acoustic surface wave.

Isolator divider strip 32 and the absorber stripes 34 may be of grease or other lossy material.

It it be desired that the system be grounded, a ground plane 46, attached to the base 14 may be provided.

In the remaining figures other than FIG. 1, the isolator divider strip 32 and the absorber stripes 34 have been omitted in order not to unnecessarily clutter up the drawings. It must be assumed that, in an actual practical embodiment, they would be present if reflections or interference between any two parallel channels is to be avoided.

The delay time of the acoustic wave device 10 is a function of the distance D, FIG. 1, between any interdigitation of the electrode of upper channel input transducer 18, and the corresponding interdigitation of the electrode of upper channel output transducer 20 and the acoustic velocity of the surface wave 40, while the velocity of the surface wave depends upon the orientation and material of the crystal material 12.

In the specific embodiment shown in FIG. 1, the input signal source 36 may either produce a repetitive uncoded signal or a coded signal of some type, such as an error correcting code, error detecting or bandwidth-conserving.

The advantage in having a coded signal, such as a Barker coded signal, from the input transducer 18 rather than from a non-Barker coded transducer is the following: If the output transducer 20 is Barker-coded and the upper channel transducer pair 16 is used as a recirculating delay line, then this Barker code would be recirculated to the input leads 38, as a pulse would be produced each time that the two codes would be coincident. If, however the transducer pair 16 is used as a matched filter configuration, the input signal is whatever signal is being received or which is being analyzed, and the output is the convolution of that signal with the convolution of the code pattern, the Barker coding, represented by the interdigitations of the electrodes 35.

A key feature of the acoustic wave device 10 of this invention is that more than one additional processor can be used on the same crystal substrate 12 independently of the first processor, upper channel transducer pair 16. Only one additional delay line is shown in FIG. 1, making a total of two. A lower channel input signal source 56 generates pulses which may be a coded electrical signal, more specifically an error-correcting, error-detecting or bandwith-conserving signal, which is conducted over leads 58 to the lower channel input transducer 28. For this channel also, the electrode configuration of this transducer 28 may match the coding of the output transducer 30. Acoustic surface wave 60 traverses the distance between the lower channel input transducer 28 and the lower channel output transducer 30, and is transduced by the latter into an electrical signal which is conducted by leads 62 into a chip amplifier 64. Conductor strips 66 connect to the chip amplifier 64, and are output leads of the chip amplifier for connection to external circuitry. (Leads for power and ground are not shown for clarity of presentation.)

Figure 2:
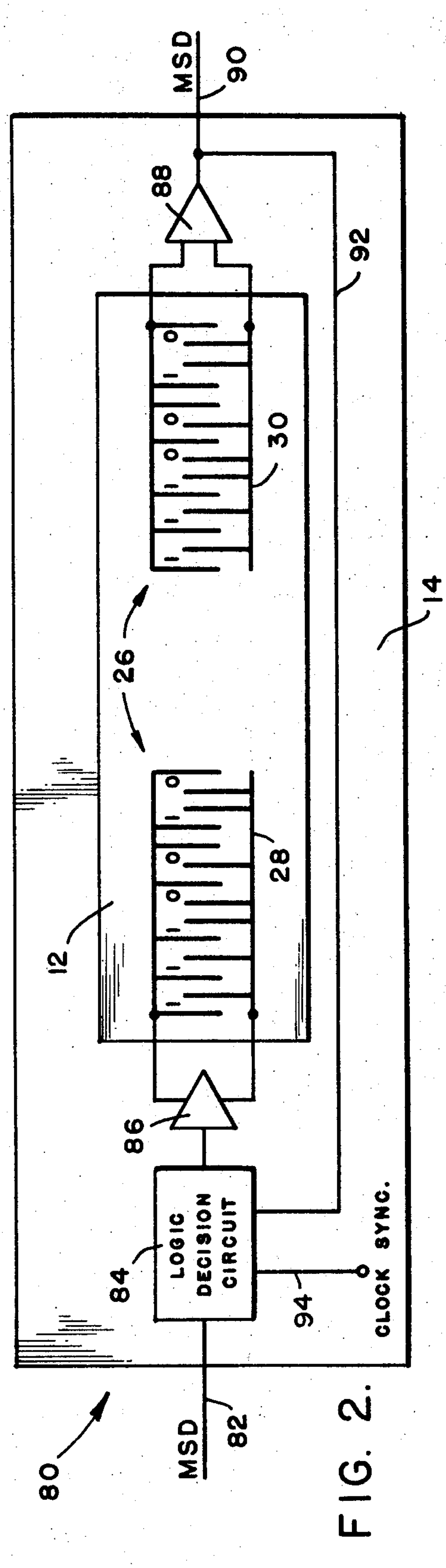
FIG. 2 is a similar type of view showing a time compressor for one channel, abstracted out of an overall analog channel, for use in time compression.

FIG. 2 illustrates a time compressor for one channel 80, and is a regenerative channel abstracted out of the overall analog channel for the device. For purposes of illustration, only one of the digits has been chosen, in this case, the most significant digit (MSD). Any other significant digit of the binary number could have been chosen. Examining a single digit of the analog signal in its quantized form, both the pulse shape and the pulse time position may be regenerated by passing the output of the transducer back to the input through a gate which is clocked by an external clock for the system through lead 94, which then provides temporal and physical reshaping of the wave form.

The sequence of pulses for the most significant digit MSD, at the input 82 to a logical decision circuit 84 may be amplified by amplifier 86 before being fed to input transducer 28. The surface wave produced by this input transducer 28 propagates along the surface of the crystal substrate 12 until it reaches output transducer 30, where the surface wave is transduced to an electrical signal which may be further amplified by amplifier 88, whose output 90 is fed back by feedback loop 92 into the logic decision circuit 84.

The logic decision circuit 84 determines whether the new most significant digit from the input or the past recirculated most significant digit from the previous input is to be entered into the time compressor for one channel 80 for the current circulation. The logical decision circuit 84 operates on timed-coincidence. The clock sync, which may be connected to an external clock by lead 94, has the purpose of clocking the bits contained in the most significant digit arriving at input 82. The feedback loop 92 from the output 90 to the logic decision circuit 84 is necessary for returning the most significant digit back to the input of the time compressor for one channel 80.

Although the transducers should be coded for the operation shown to decrease the insertion loss, the coding may be of some other type rather than the Barker coding shown. A two-channel type of complementary coding is particularly advantageous. This type of coding is explained in great detail in the patent having the No. 3,551,837, which issued on Dec. 29, 1970, and is entitled "Surface Wave Transducers with Side Lobe Suppression."

In summary, FIG. 2, essentially, represents a one-channel DELTIC operation. Although the device called a DELTIC is well known in the computer art, a brief description may be useful. A DELTIC is a delay line time compressor which is implemented generally by means of a quartz bulk wave delay line in which the length of the delay line in time is one unit of time less than the time between successive pulses applied to its input. The output of the delay line is added by means of logical circuitry with its input so that successive outputs are fed back to the input when there is no external input present. When finally the line is full, and the output and input are both available simultaneously, input data takes precedence over recirculating data. Thus, such a device stores at the clock rate of the digital circuitry as much past history of the input signal as there are discretely realizable bit locations in the delay line. When it is desired to read out the information stored in the DELTIC, it is possible to discriminate between the incoming data and the recirculating storage data. There is only one output for the DELTIC, but two inputs.

Actually, the DELTIC logic is somewhat more complicated than indicated above. The logical gate structure, more precisely, is as follows: The output bit is applied to the input if there is no input bit present, and the incoming input bit, not the recirculating bit, is applied to the input if there is an incoming bit present.

In DELTIC operation it is important not only to make the height of the regenerated pulse new, on each regeneration, but it is also important to make the exact timing equally spaced to take care of any timing jitters which may have occurred in the process. This is why pulses from a clock sync source, for example, coming from lead 94, are usually required.

When multiple channels are used, as shown hereinbelow in FIG. 4, in order to preserve interchannel phase relationships, simultaneous compression of the information traversing each channel must take place. This is readily achievable, in the implementations of this invention, since dimensional registration between channels can be controlled to a fraction of a wave length. This result may be achieved due to the fact that a single crystal substrate 12 is used upon which are located the several channels. In a multiple-channel system where there are specific time relationships at the input of the system related to, for example, the spacially received signals, a single surface wave crystal, because of the high mechanical stability of all parallel channels, may be used to preserve the same time relationships in compressed form, since photo-registration of the electrodes allows for registration which is accurate to within a small fraction of a wave length, corresponding to small fractional wavelength positioning of the transducer.

If a circuit is made for a clock which has a configuration similar to that of the DELTIC, but where the output signal is simply fed back, with sufficient amplitude, to the input without an additional input signal, then there results a digital clock circuit. After ($n$-1) circulations of the DELTIC pulses in all locations, the circuit can be considered to be a digital clock, which generates sinusoidal waves, which may be clipped and otherwise shaped if need be.

Figure 3:
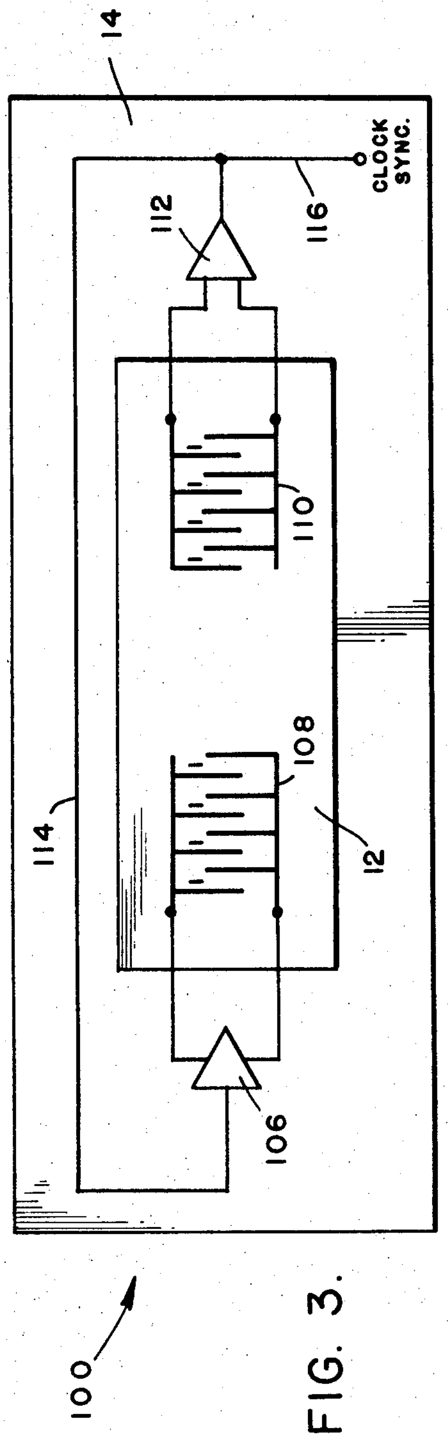
FIG. 3 is a similar type of view showing a transducer pair connected in a manner so as to result in a continuous wave oscillator, which may serve as a source of clocking pulses.

FIG. 3 shows an acoustic wave device implemented in the form of a continuous wave oscillator 100, which may also be used to generate clock pulses. An amplifier 106 has its output connected to an input transducer 108 having uniformly coded, that is, uncoded, interdigitated electrodes, as shown by the four 1's in the figure. An uncoded output transducer 110 has its output leads connected to an output amplifier 112. A feedback loop 114 connected from the output amplified 112 into the input amplifier 106 forms a necessary feedback element for oscillator action. Clock sync pulses, suitable for clocking processing circuits, may be derived by means of output lead 116.

As the embodiment is shown in FIG. 3, this oscillator 100 may be implemented upon, or form, one of the channels on the substrate 12. The frequency of oscillation then becomes a function of the temperature of the substrate 12. The other channels comprising other processors disposed upon the same substrate 12 become electronically compensated with respect to frequency.

As may be seen in FIG. 3, the interdigitations of the electrodes of both the input transducer 108 and the output transducer 110 are alternate, that is, uncoded, in that the interdigitations show uniform alternations with respect to a pair of electrodes forming either an input transducer or an output transducer. The alternate interdigitations correspond to an encoding pattern of, in the embodiment shown, of 1, 1, 1, and 1 for both the input and output transducers 108 and 110. This results in a narrow band filter effect which is necessary in order to achieve high-frequency stability. A clock oscillator 100 featuring a 50–50 percent distribution of the input, or launch, and output, or receiver, transducer electrode elements results in an oscillator having a very high Q. Such a construction for the clock oscillator 100 is equivalent to using integral transmission line tank circuits of many wave length equivalents, that is, a high Q circuit.

In order that a pair of transducers 108 and 110 form an oscillator 100, it is not necessary that both the input transducer and the output transducer have the same number of interdigitations. However, as indicated above, a greater selectivity is obtained when the interdigitations are numerically equal. Therefore, a desired selectivity may be obtained.

Some embodiments of this invention may be used for time compressing of a digital word which may represent an analog signal input. This function has already been discussed in detail for one channel in FIG. 2, and is shown in FIG. 4 for five channels. Analog time compression may be achieved by means of analog-to-digital and digital-to-analog conversions with registered and synchronously clocked digital delay paths on the piezoelectric crystal substrate 12.

Figure 4:
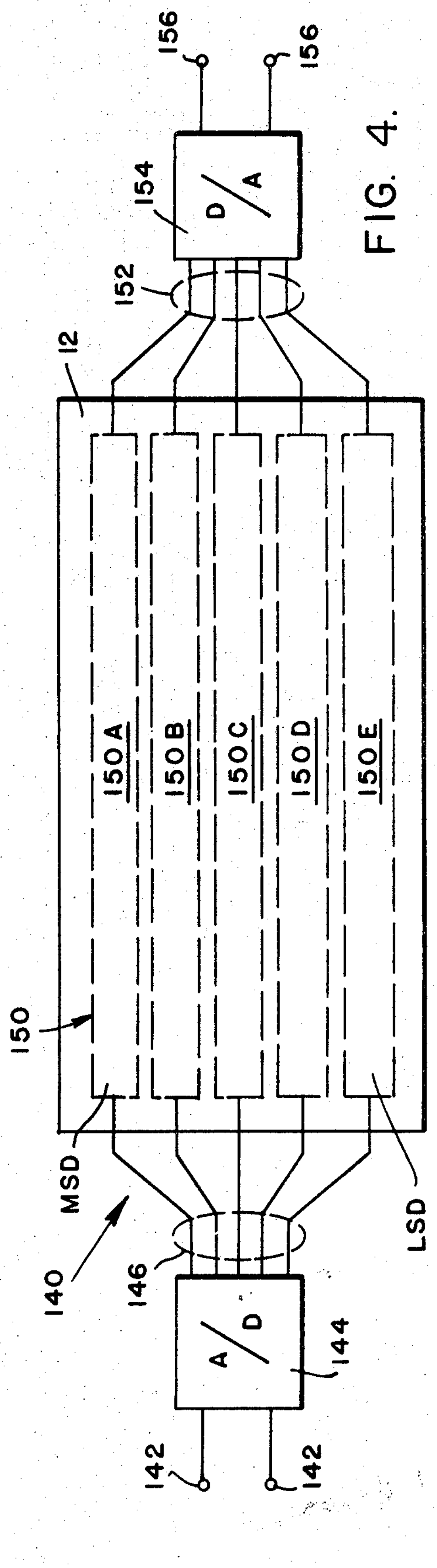
FIG. 4 shows a block diagram of an implementation for use as a time compressor, with five channels, one of which is the same as the channel shown in FIG. 2.

FIG. 4 shows a time compressor 140 by means of which a parallel digital word, which may represent an analog input signal coming into the compressor at input leads 142, may be time-compressed. The analog signal is applied to an analog-to-digital (A/D) converter 144, each of the digits representing the analog signal, from the most significant digit (MSD) to the least significant digit (LSD), then being stored and propagated in separate channels 150A through 150E located on the surface of the crystal substrate 12. Pulse-in pulse-out equivalent transducers implemented by means of coding theory on the surface of a crystal substrate 12 represent binary storage channels 150A through 150E. The information corresponding to these binary digits is then transmitted through leads 152 to the output digital-to-analog (D/A) converter 154 to form the reconstructed analog signal at the output leads 156. In the digital compressor unit 150 consisting of digital channels 150A through 150E, each channel is similar to the channel in FIG. 2 which includes transducer pair 26. More precisely, channel 150A for the most significant digit corresponds to the channel which includes transducer pair 26.

In order not to unnecessarily clutter up FIG. 4, only one input connection, shown collectively by reference numeral 146, to each digit channel 150A through 150E, is shown. It may be considered to consist of two leads. Similarly, only one output connection per channel, shown collectively by reference numeral 152, to the D/A converter 154 is shown. Also, for simplicity, the logic decision circuit 84, input amplifier 86, feedback loop 92 and the clock sync lead 94 are not shown, although they would be required in a practical implementation for time compressor 140. Also not shown are the isolator divider strips 32 of FIG. 1, between each channel. By means of a connection to a clock sync source, such as is shown in FIG. 2 but not shown in FIG. 4, registered and synchronously clocked digital delay paths are guaranteed for all the digits in all channels 150A through 150E.

Once the signal has been converted from an analog to a digital format, each individual digit position, from the most significant to the least significant, passes through the structure shown in FIG. 4, and may be recirculated on itself according to the general rules known for DELTIC operation. When an analog signal fed into this acoustic wave device 140 for storage has been converted into a digital representation by conventional analog-to-digital conversion techniques, then the digital storage afforded by the surface of the crystal substrate 12 can be connected in a time compressor arrangement called the DELTIC such that the digital-to-analog converted signal may be connected at the output of the recirculating DELTIC loop and reconstructed to the level of the approximation given by the initial analog-to-digital conversion, with the analog signal being reconstituted at the output 156.

Temperature stability of the various acoustic wave devices is assured through the use of an integral surface wave clock generator such as that shown in FIG. 3, which controls the recirculation period of the time compressors. Temperature stability is assured electronically by means of compensation of the structure by means of an integral clock whose pulse frequency is a function of the temperature of the substrate 12, or in crystals, such as quartz, which have properly oriented cuts, the initial temperature sensitivity may be minimized by choosing such an orientation. Lithium tantalate is another material besides quartz with controllable temperature characteristics.

Clocks, time compressors, correlators, and matched filters may be fabricated on one and the same crystal substrate. Each is individually constructed as a separate channel on a substrate, for example, one channel for the clock, four or five channels for the time compressor, followed by a channel with proper coding corresponding to the correlator.

A correlator, in general, may be defined as a device which has two input terminals and one output terminal. The two signals at its inputs are multiplied together and the product is integrated and is made available at its output, which is the third terminal.

A matched filter, on the other hand, normally has a total of but two terminals, an input terminal and an output terminal. A signal applied to the input terminal is successively multiplied and integrated by the internal configuration of the filter by means, mathematically, of the transfer function and this multiplied and integrated product is made available at the output terminal of the matched filter.

A correlator and a matched filter become functionally equal if the signal which would have been applied to the second input of the correlator is made to be the time inverse of the impulse response of the matched filter.

With this background information out of the way, the remaining figures may now be discussed.

Figure 5:
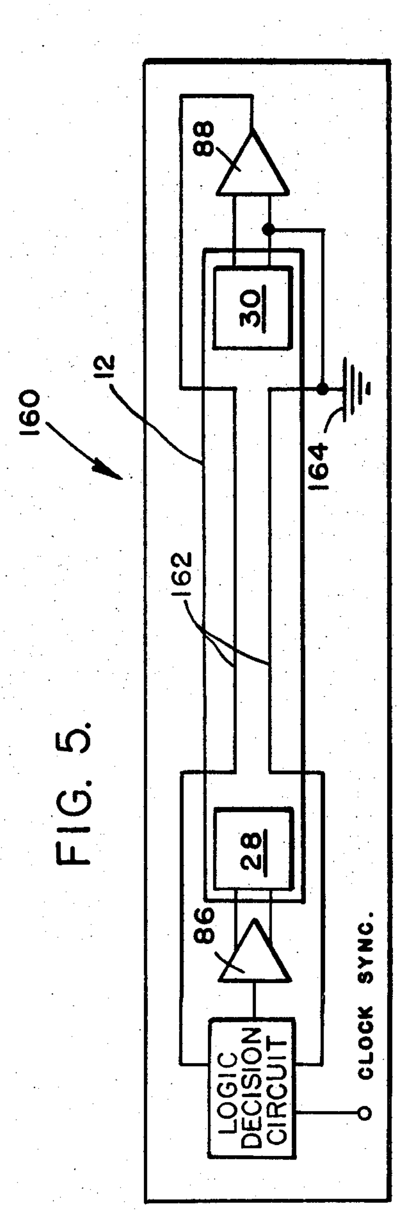
FIG. 5 is a schematic diagram of an implementation using a combination of acoustic and electrical wave propagation.

FIG. 5 is a schematic illustration of a combination acoustic and electrical system, herein termed an electro-acoustic processor 160. FIG. 5 is similar to FIG. 2, with the feedback loop 92 replaced by a metallization strip 162, consisting of two conductors, one grounded at 164. Acoustically, the transducer 30 is responsive as already discussed with reference to FIG. 2, to transducer 28. Both transducers 28 and 30 are shown in simple block form in this figure. Input amplifier 86 and output amplifier 88 are used for amplifying the electrical signal. Metalization has been applied to the external portion of the acoustic propagation path in such a manner that the metalization 162 supplies two functions: (1) on a substrate 12 which has a low velocity of propagation relative to the velocity of propagation in the metalization strip, i.e., aluminum on glass, the metalization strip 162 forms an acoustic wave guide confining the propagation from the transducer to only that region within the middle of the metalization strip, while, simultaneously, at high frequencies, the two conductors of the acoustic wave are likewise to be considered conductors of an electrical signal along a parallel-line transmission line, so that the electrical response of the acoustic wave from the output of the amplifier 88 is passed by means of the metalization strip 162 back into the input amplifier 86, the metalization strip thus forming a recirculation loop, in such a manner that transmission line losses do not occur. This is equivalent to a system such as a balanced strip line for the electrical transmission, combined with an acoustic wave guide for the acoustic transmission, and using parts which are ultimately required for the operation of the device, thereby getting additional benefits from parts which were required in any case. The structure disclosed in this FIG. 5 is actually, more precisely, similar to a differential strip line, this implying the presence of a ground plane, either one side being grounded and with another line operating against the implied ground, or there is an implied ground elsewhere in the system and both lines are operating adjacent to the ground plane.

Still referring to FIG. 5, neither lead of the metalization strip 162 need be grounded if input amplifier 86 and output amplifier 88 are balanced amplifiers. In such a case, a neutral point, such as a center tap, in both amplifiers 86 and 88 would be selected for grounding. Under these conditions, transducers 28 and 30 would preferably be differential transducers.

More generally, with respect to common bus lines, whether in connection with a ground line or a power supply line, the latter particularly is not shown in the drawings, it being assumed that a person skilled in the art would know how to connect them.

Figure 6:
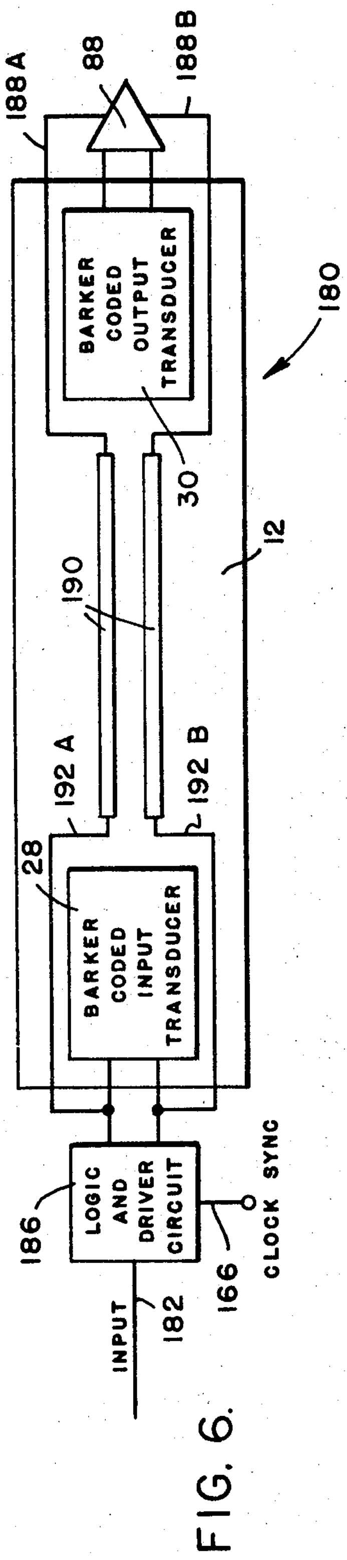
FIG. 6 is a view, partly diagrammatic and partly in block form, of a time compressor, quite similar to that shown in FIG. 2, but using transmission line feedback.

FIG. 6 is a block diagram showing an electroacoustic processor 180, including a guided wave structure using transmission line feedback of the electrical signal to complement the propagation of the acoustic wave. This technique would be important for operation in the gigacycle frequency range. Operation at these frequencies may be obtained by the use of a lithium niobate crystal and other crystals suitable in the extremely high frequency range. For operation in this frequency range, it may be desirable to use an integrated acoustic and electrical transmission. An electrode may be disposed on the bottom of the substrate 12 where there is no acoustic wave propagating, which structure also is reminiscent of a strip line.

FIG. 6 is primarily a block diagram showing a complete electroacoustic processor 180, having the function of time compression, similar to a DELTIC. Excepting for the inclusion of a transmission line feedback circuit, FIG. 6 very closely resembles FIG. 2. An input signal, which may be a Barker-coded signal, entering the processor 180 by means of input lead 182 is clocked by a clock sync signal entering by means of clock lead 166. Both signals enter the logic and driver circuit 186. As before, the purpose of this circuit 186 is to decide, on the basis of timing considerations, whether the input signal 182 should be entered into the complete electro-acoustic processor 180, or whether the stored output signal should be applied, by means of leads 192. The logical functions of logic and driver circuit 186, have already been detailed in the discussion of the DELTIC delay-line time compressor 80, with reference to FIG. 2, and, more specifically, with respect to logic decision circuit 84.

The driving function of the logic and driver circuit 186 can be implemented by transistors and other solid state circuitry, which match the impedance and power requirements of the Barker-coded input transducer 28.

From input transducer 28, an acoustic surface wave (not shown) propagates to the Barker-coded output transducer 30, from whence it is amplified in output amplifier 88.

Feedback loop 188 A–B feeds at least a portion of the output signal back to transmission line 190, which in turn feeds a signal back to the input transducer 28, by means of feedback loop 192 A–B.

The mode of operation is more or less an elaboration on the mode of operation shown in FIG. 5.

Figure 7:
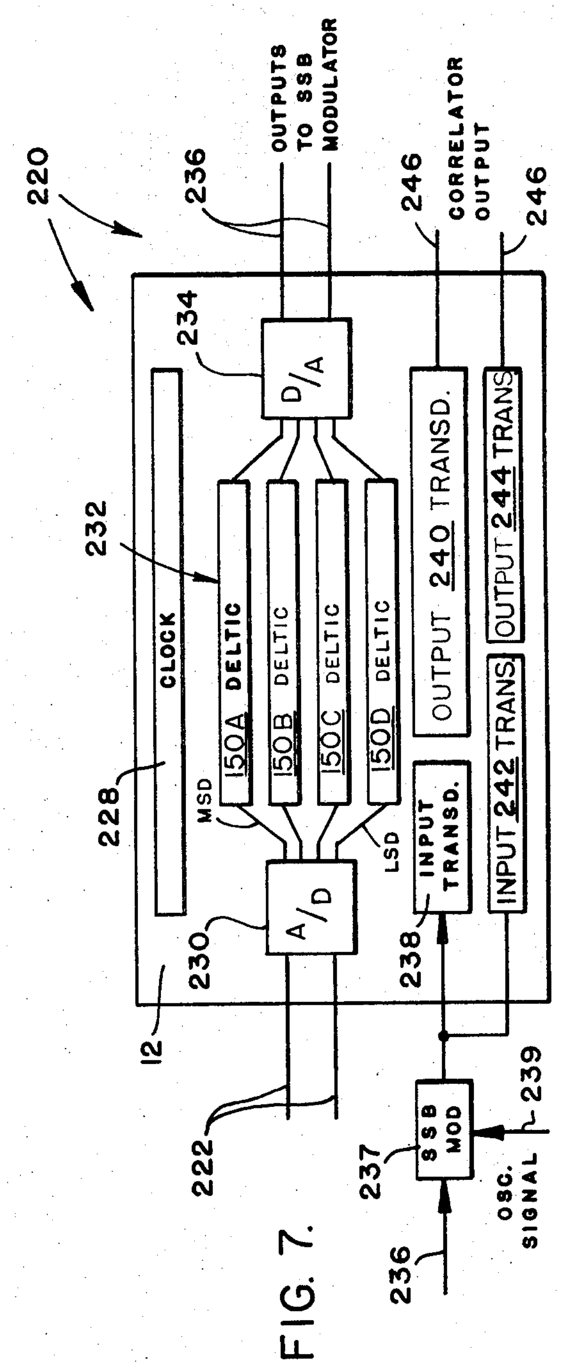
FIG. 7 is a block diagram of a signal processing device serving as a time compressor, and including surface wave devices serving as a clock and correlators.

FIG. 7 is a block diagram showing a transducer combination 220 of various transducer devices shown in the previous figures, in addition to a matched filter 240. While not specifically shown, each clock shown on the crystal substrate 12 includes at least one set of interdigitated electrodes, coded or uncoded. Clock 228 may represent, in a very simplified block form, the continuous-wave clock oscillator 100 shown in FIG. 3.

A four-channel DELTIC 232 is shown together with a set of implied A/D converters 230 and a set of implied D/A converters 234, together with inputs 222, the combination being identical in function to the time compressor 140 shown in FIG. 4. If the inputs 222 are from a quantizer, then the A/D converters 230 would not be required, the inputs going directly to the four-channel DELTIC 232.

The outputs 236, in a specific embodiment, were connected to a frequency translator, such as single-sideband modulator 237, which is shown in the lower left-hand side of FIG. 9, where it is used with a transducer embodiment not heretofore described, the matched filter 240. One of the output signals 236 is heterodyned with a signal from an oscillator, coming from lead 239, in SSB modulator 237, or some other tupe of frequency translator. The oscillator signal may originate from a signal generated by the clock 228, although the connection is not shown. The modulated signal is fed into input transducer 238, with a matching function being contained in matched filter 240, or alternatively, the combination 238 and 240 providing the matching function. This is shown on the lower portion of the base 14, transducers 242 and 244 being an alternate representation of the same matched filter function.

The output signal from the SSB modulator 237 enters the input transducer 238 for the matched filter 240. The input signal to the matched filter depends upon the spectral shape of the desired filtering function. A small input transducer 238 followed by a rectangularly disposed matched filter impulse reaponse would be appropriate for the binary signal channel, while the amplitude-weighted response corresponding to transducer 242 in conjunction with transducer 244 would be more appropriate for those matched filters which use amplitude data as a result of having gone through the quantized DELTICS.

The correlator output leads are designated by 246 and typically one would be a sum channel and the other a difference channel, and interferometry would take place between them.

The various acoustic wave devices herein described may be implemented with other than binary codes, utilizing auto-correlation functions with prescribed properties, in particular to produce a pulse response for a pulse input. Chirps and impulse-equivalent waveforms corresponding to Huffmann codes may be used since the acousto-electric interaction of the acoustic wave correlates the two transducer patterns, providing an output proportional to the auto-correlation function which becomes the desired output. "Chirp" signals have been discussed in the prior art. A "chirp" may be defined as a linear FM sweep or more generally, as some form of frequency sweep where the frequency is varying in a prescribed manner, but normally increasing or decreasing monotonically.

A waveform corresponding to a Huffman code uses only two phase shifts 180° out of phase, but amplitude is a variable, thus not using all of the area available for the transducer. However, it succeeds in eliminating all minor lobes except those at the extreme shifts and is significantly better than either Barker of chirp codes for reducing intersyllable interference.

In addition, use may be made of cross correlation where the input and output transducers have different codes. Such patterns are useful for minor lobe suppression, as with the Huffman code, providing intersyllable interference suppression, and may be obtained by mismatched filtering, such as with modified Barker codes.

With respect to alternative embodiments for the substrate to be used with the acoustic wave device, other materials besides quartz which may be used are: (a) any other piezoelectric material; and (b) single crystal ferro-electric materials.

In general one uses a substrate whose temperature coefficient is chosen to be equal and opposite to the change in the velocity of propagation, say in parts per million, and then chooses a film for additional electrical characteristics, the film being thin enough so that it does not appreciably affect the acoustical characteristics of the substrate, except as described in connection with the discussion of FIG. 5.

A polycrystaline piezoelectric or ferroelectric film may be used on any substrate which has, in principle, the same velocity of wave propagation as the velocity of the film. Similar velocities are necessary in order to not have acoustic dispersion.

The spectral response of the transducers herein described may be varied in one of two alternative ways:

Alternative 1:

A constant-width transducer, where the width of the transducer is measured in a direction perpendicular to the direction of wave propagation, may have its spectral response changed, in the frequency domain, by changing the width of the individual electrode stripes.

Alternative 2:

The spectral shape of the transducer in the frequency domain may be changed by changing the physical width of the overall transducer on the substrate.

While they both accomplish the same results of spectral weighting of the frequency of the signal, the two different types of shading have different effects on the directivity pattern.

In the first alternative, where the physical overall width or lateral displacement of the whole transducer remains fixed and only the width of the interdigitations vary, the directivity pattern of the transducer remains more or less fixed.

Conversely, in the second alternative, where the actual lateral width of the whole transducer changes, the directivity, which becomes the Fourier transform of the aperture of the transducer in its physical realization, has thus been changed by the lateral change and its directivity has changed. Combining variations of the individual interdigitations with width variation of the entire transducer, there are available two degrees of freedom, which allows one to achieve spectral shadings simultaneously with directivity control.

Obviously many modifications and variations of the present invention are possible in the light of the above teachings. It is therefore to be understood that within the scope of the appended claims the invention may be practiced otherwise than as specifically described.

What is claimed is:

1. A distributed-transducer acoustic wave device, for signal processing, comprising:

a crystal substrate;

at least one transducer set disposed upon the crystal substrate, each transducer set including at least an input transducer adapted to receive an input electrical signal and an output transducer, each input and output transducer including at least a pair of interdigitated electrodes which, upon application of a signal to the input transducer, cause acoustic wave propagation on the surface of the crystal substrate, the electrodes of each transducer of each transducer set being aligned in the direction of wave propagation;

the interdigitations of the electrodes of at least one of the transducers of at least one of the transducer sets being coded; and a logic decision circuit having three input connections:

1. a first input connected to the output transducer;
2. a second adapted for connection to a clock sync source; and
3. a third adapted for connection to a source of binary signals;

the logic decision circuit having its output connected to the input transducer;

a function of the logic decision circuit being to enable an incoming pulse from the binary signal source, if present, to be transmitted to the input transducer, otherwise to enable a pulse from the output transducer to be circulated through the transducer set, all pulses being clocked by signals from the clock sync source; the combination forming a time compressor.

2. The combination as recited in claim 1, wherein: the substrate consists of a piezoelectric crystal.

3. The combination as recited in claim 2, wherein: the piezoelectric crystal is quartz.

4. The combination as recited in claim 1, wherein: the code is a Barker code.

5. The combination as recited in claim 1, further comprising:

a second transducer set disposed upon the crystal substrate, the electrodes of the transducer sets being disposed upon the crystal substrate in a parallel relationship;

the input and output transducers of the second transducer set also being connected to the logic decision circuit.

6. The combination as recited in claim 5, further comprising:

an isolator divider strip disposed upon the substrate between each transducer set; and an absorber stripe disposed upon the substrate at each end of a transducer set.

7. The combination as recited in claim 6, wherein the two transducer sets are coded according to a coded complementary pair.

8. The combination as recited in claim 1, further comprising:

an input amplifier connected to the input transducer, for impressing an amplified input electrical signal upon the electrodes of the input transducer, the electrical signal being transduced to an acoustic surface wave traversing the surface of the substrate in a direction toward the output transducer; and an output amplifier connected to the output transducer for amplifying the signal transduced by the electrodes of the output transducer.

9. The combination as recited in claim 8, further comprising:
- an analog-to-digital converter, connected to the input of the logic decision circuit, whose output forms a plurality of binary input signals, the plurality equal to the number of digits into which the analog signal is converted, and equal to the number of transducer sets; and
- a digital-to-analog converter, connected to the output transducers, for converting the plurality of binary signals into its corresponding analog form.

10. The combination according to claim 9, further comprising:
- a clock source disposed upon the same substrate, for clocking the propagation of the pulses in the various channels of the time compressor.

11. The combination according to claim 10, further comprising:
- another transducer set, consisting of an input and an output transducer, mounted on the same substrate;
- a frequency translator, whose input is connected to the output of the digital-to-analog converter and whose output is connected to the input transducer of the last-named transducer set;
- the frequency translator having another input adapted for connection to an oscillator, for causing a frequency translation of the input signal.

12. The combination according to claim 11, wherein the frequency translator is a single-sideband modulator.

* * * * *